United States Patent
Lane (10) Patent No.: US 8,454,343 B2
(45) Date of Patent: *Jun. 4, 2013

(54) BLOW MOLD DESIGN

(75) Inventor: Michael T. Lane, Brooklyn, MI (US)

(73) Assignee: Amcor Limited, Hawthorn (AU)

( * ) Notice: Subject to any disclaimer, the term of this patent is extended or adjusted under 35 U.S.C. 154(b) by 182 days.

This patent is subject to a terminal disclaimer.

(21) Appl. No.: 12/987,354

(22) Filed: Jan. 10, 2011

(65) Prior Publication Data

US 2011/0165285 A1 Jul. 7, 2011

Related U.S. Application Data (63) Continuation-in-part of application No. 11/700,571, filed on Jan. 31, 2007, now Pat. No. 7,887,315.

(51) Int. Cl.
*B29C 49/48* (2006.01)
*B29C 49/64* (2006.01)

(52) U.S. Cl.
CPC .................................. *B29C 49/4823* (2013.01)
USPC ............................. 425/195; 249/79; 249/102

(58) Field of Classification Search
USPC ............................. 425/195, 526; 249/79, 102
See application file for complete search history.

(56) References Cited

U.S. PATENT DOCUMENTS

| | | | |
|---|---|---|---|
| 3,632,249 A | | 1/1972 | Pearson |
| 4,141,680 A | * | 2/1979 | Kauffman et al. ............ 425/529 |
| 4,548,825 A | | 10/1985 | Voss et al. |
| 4,566,895 A | | 1/1986 | Kusakabe |
| 5,968,560 A | | 10/1999 | Briere et al. |
| 6,116,888 A | * | 9/2000 | Johnston et al. .............. 425/195 |
| 6,412,308 B1 | * | 7/2002 | Lewis et al. ..................... 249/79 |
| 6,444,159 B2 | | 9/2002 | Petre |
| 6,447,281 B1 | | 9/2002 | Petre |
| 6,615,472 B2 | | 9/2003 | Petre |
| 6,648,623 B2 | | 11/2003 | Petre |
| 6,746,225 B1 | * | 6/2004 | McHugh ........................ 425/130 |
| 6,948,924 B2 | | 9/2005 | Tsau et al. |
| 7,887,315 B2 | * | 2/2011 | Lane ............................. 425/195 |
| 2006/0204608 A1 | | 9/2006 | Neter et al. |
| 2010/0104681 A1 | | 4/2010 | Dagorn |

FOREIGN PATENT DOCUMENTS

| | | |
|---|---|---|
| EP | 0976517 | 2/2000 |
| WO | WO 97/07965 | 3/1997 |
| WO | WO 2005/042231 | 5/2005 |
| WO | WO 2008/094649 | 8/2008 |

OTHER PUBLICATIONS

International Search Report and Written Opinion dated Aug. 22, 2012 from corresponding International Patent Application No. PCT/US2012/020271 (six pages).

* cited by examiner

*Primary Examiner* — Robert B Davis
(74) *Attorney, Agent, or Firm* — Harness, Dickey & Pierce, P.L.C.

(57) ABSTRACT

A blow mold shell assembly includes a mold cavity insert defining a mold profile on an inner surface. A manifold insert is separately formed from the mold cavity insert and disposed outboard of the mold cavity insert. The manifold insert includes at least one coolant channel formed therein. The mold cavity insert is substantially solid throughout its cross-section and precluded from passing coolant. In one example, the coolant channels may be formed longitudinally through the manifold insert. A fluid inlet fitting and a fluid outlet fitting are both in fluid communication with the manifold insert.

17 Claims, 6 Drawing Sheets

BLOW MOLD DESIGN

CROSS-REFERENCE TO RELATED APPLICATIONS

This application is a continuation-in-part of U.S. patent application Ser. No. 11/700,571 filed on Jan. 31, 2007, the entire disclosure of which is incorporated herein by reference.

TECHNICAL FIELD

This disclosure generally relates to an apparatus and method for forming a plastic container. More specifically, this disclosure relates to a blow mold tooling configuration having an integrally formed manifold die cavity.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities. As a result, blow-molded plastic containers have become commonplace in packaging numerous commodities.

Molds used to form such containers generally include four key features; A) a molding surface to form the container shape, B) vents formed in the cavity to atmosphere that allow air to egress the cavity as a preform inflates within the mold and ingress as the container exits the tool, C) a network of fluid channels routed within the cavity to achieve a desired mold temperature, and D) exterior mold mounting features matching machine hanger specifications.

Traditionally, one mold configuration for forming such containers includes a two-piece mold. A two-piece mold generally includes a mold holder and a cavity insert mounted within the mold holder. The cavity insert can define features A, B and C above, while feature D is defined in the mold holder. The mold holder and cavity insert are then fitted within a machine hanger. The machine hanger opens and closes the blow mold. Such two-piece mold configurations are typically used for containers having smaller diameters such as less than 95 mm (3.74 inches) for example, commonly referred to as 150 mm (5.91 inches) (referring to the inside diameter of the holder). For larger containers, a one-piece mold may be used. In a one-piece mold, all four of the above features, A, B, C and D are included in the cavity insert. Such one-piece mold configurations are used to accommodate formation of containers having diameters up to 140 mm (5.51 inches).

In either instance, it is necessary to cool the mold assembly during the mold process. In this way, cooling channels can be located within the cavity insert for delivering oil or other fluid through the cavity insert. As can be appreciated, designing and constructing such cavity inserts is complex and costly. Furthermore, because the cavity insert must be switched out when container designs change, each new mold cavity must be individually designed and formed with cooling channels routed through the structure. Thus, there is a need for a mold configuration that allows for simpler, more cost effective cooling of the mold cavity.

SUMMARY

This section provides a general summary of the disclosure, and is not a comprehensive disclosure of its full scope or all of its features.

Accordingly, the present disclosure provides a blow mold shell assembly having a mold cavity insert defining a mold profile on an inner surface. A manifold insert is separately formed from the mold cavity insert and disposed outboard of the mold cavity insert. The manifold insert includes at least one coolant channel formed therein. As can be appreciated, significant cost advantages result from the shell assembly provided herein as coolant channels need not be designed and constructed for each mold cavity design.

According to additional features, the mold cavity insert is substantially solid throughout its cross-section and precluded from passing coolant. The coolant channels may be formed longitudinally through the manifold insert. A fluid inlet fitting and a fluid outlet fitting are both connected to the manifold insert. The mold cavity insert can include a shoulder insert, a body insert and a base insert, any combination thereof, and/or a single, one-piece insert. A mold holder can be arranged outboard of the manifold insert. Because the manifold insert is separately formed from the cavity insert, it remains assembled to the mold holder during a mold cavity exchange.

Additional benefits and advantages of the present disclosure will become apparent to those skilled in the art to which the present disclosure relates from the subsequent description and the appended claims, taken in conjunction with the accompanying drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
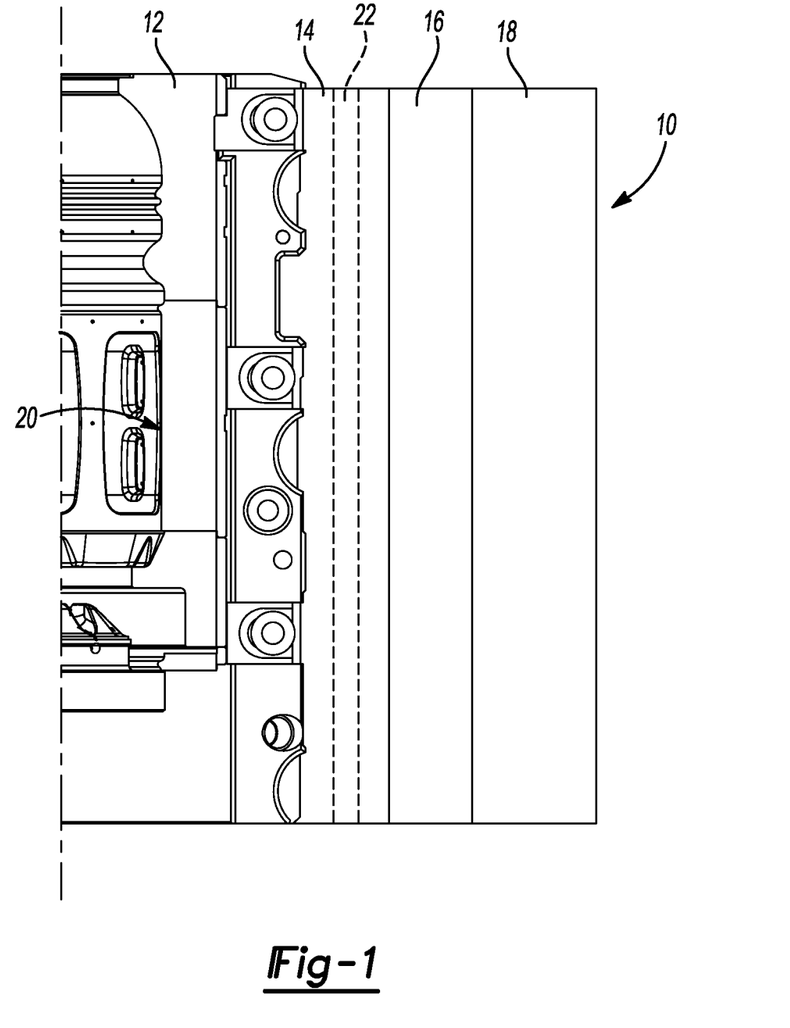
FIG. 1 is a schematic cross-sectional depiction of a blow mold shell assembly including a mold cavity insert and a separately formed manifold insert constructed in accordance with the teachings of the present disclosure and arranged inboard of an exemplary mold holder and machine hanger.

With initial reference to FIG. 1, a blow mold shell assembly according to the present teachings is shown and generally referred to as reference numeral 10. In general, the blow mold shell assembly 10 includes a mold cavity insert 12, a manifold insert 14, a mold holder 16 and a machine 18. The mold cavity insert 12 may comprise a series of mold inserts, or a single, one-piece insert, as will be described that cooperate to define a mold profile 20 on a collective inner surface. The mold cavity insert 12 is substantially solid throughout its cross-section and therefore does not include coolant channels. The manifold insert 14 according to the present teachings is separately formed from the mold cavity insert 12 and defines a plurality of coolant channels 22 therein. It is appreciated that the mold holder 16 and machine 18 are merely exemplary. As will become appreciated from the following discussion, a dedicated manifold insert 14 offers significant cost advantages over a blow mold shell assembly incorporating cooling channels within the mold cavity itself. Such cost saving are realized through the use of faster, less expensive processes for manufacturing the mold cavity insert 12. These processes for manufacturing the mold cavity insert 12 include, for example, selective laser sintering (SLS) technology and direct metal laser sintering (DMLS) technology. Additionally, these processes lend themselves to the use of a wide variety of materials including, but not limited to, steels, light alloys, super alloys and composites.

Figure 2:
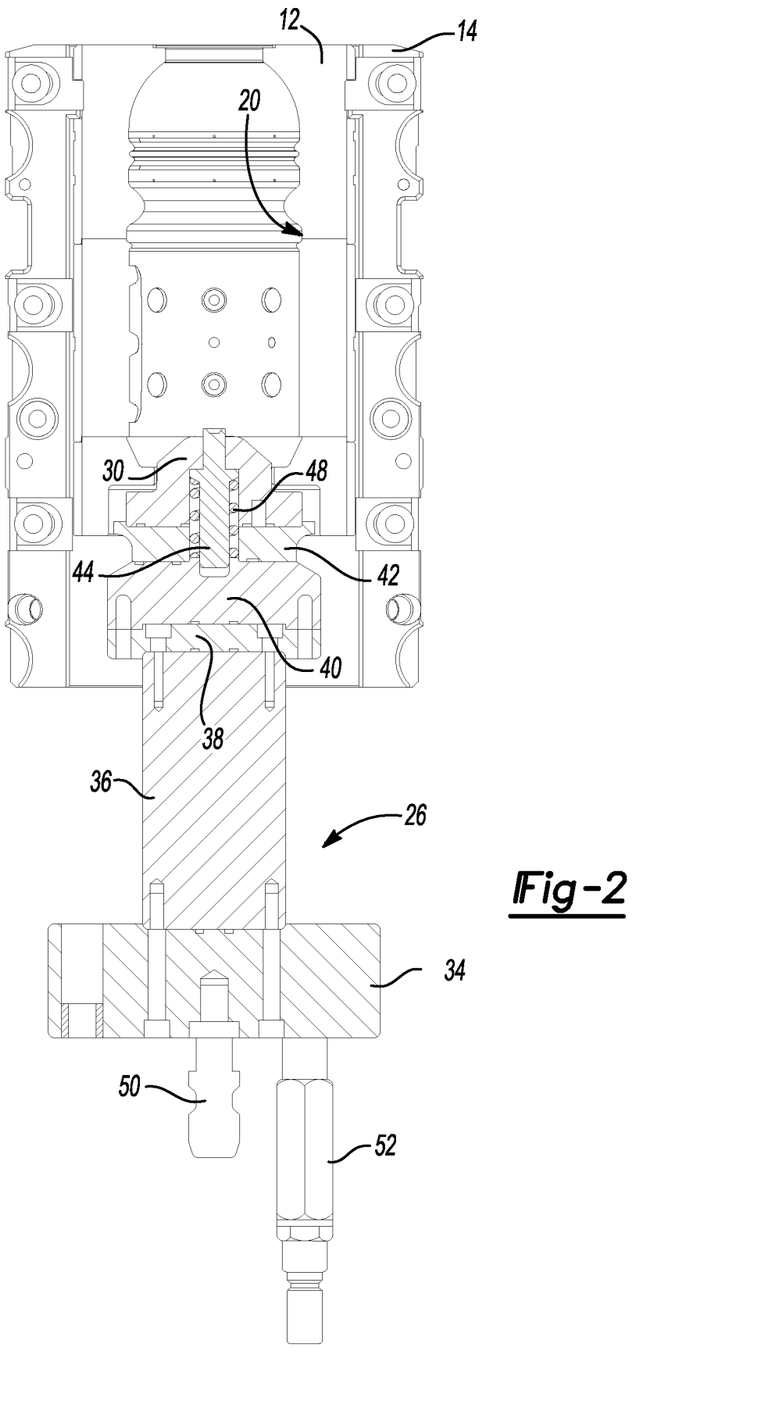
FIG. 2 is a cross-sectional view of a mold cavity insert assembly and a manifold insert assembly according to the present teachings and shown engaged to an. exemplary pedestal assembly.

Turning now to FIG. 2, the mold cavity insert 12 and manifold insert 14 are shown cooperatively engaged to an exemplary pedestal assembly 26. The pedestal assembly 26 generally engages a base insert 30 and/or a base portion 230 (not illustrated) of the mold cavity insert 12. The pedestal assembly 26 can include a spacer plate 34, an elongated spacer 36, a shim 38, an upper spacer 40, a base locating plate 42 and a plunger 44. The plunger 44 can be biased in a direction away from the upper spacer 40 by a biasing member 48. A locating lug 50 can be disposed on an end of the spacer plate 34. Fluid fittings 52 (only one is shown) can be coupled at the end of the spacer plate 34. In general, the pedestal assembly 26 translates axially to removably couple to the base insert 30 and/or the base portion 230 (not illustrated) during formation of a container. It is appreciated that the pedestal assembly 26 is merely exemplary and may be formed differently and/or comprise other components.

Figure 3:
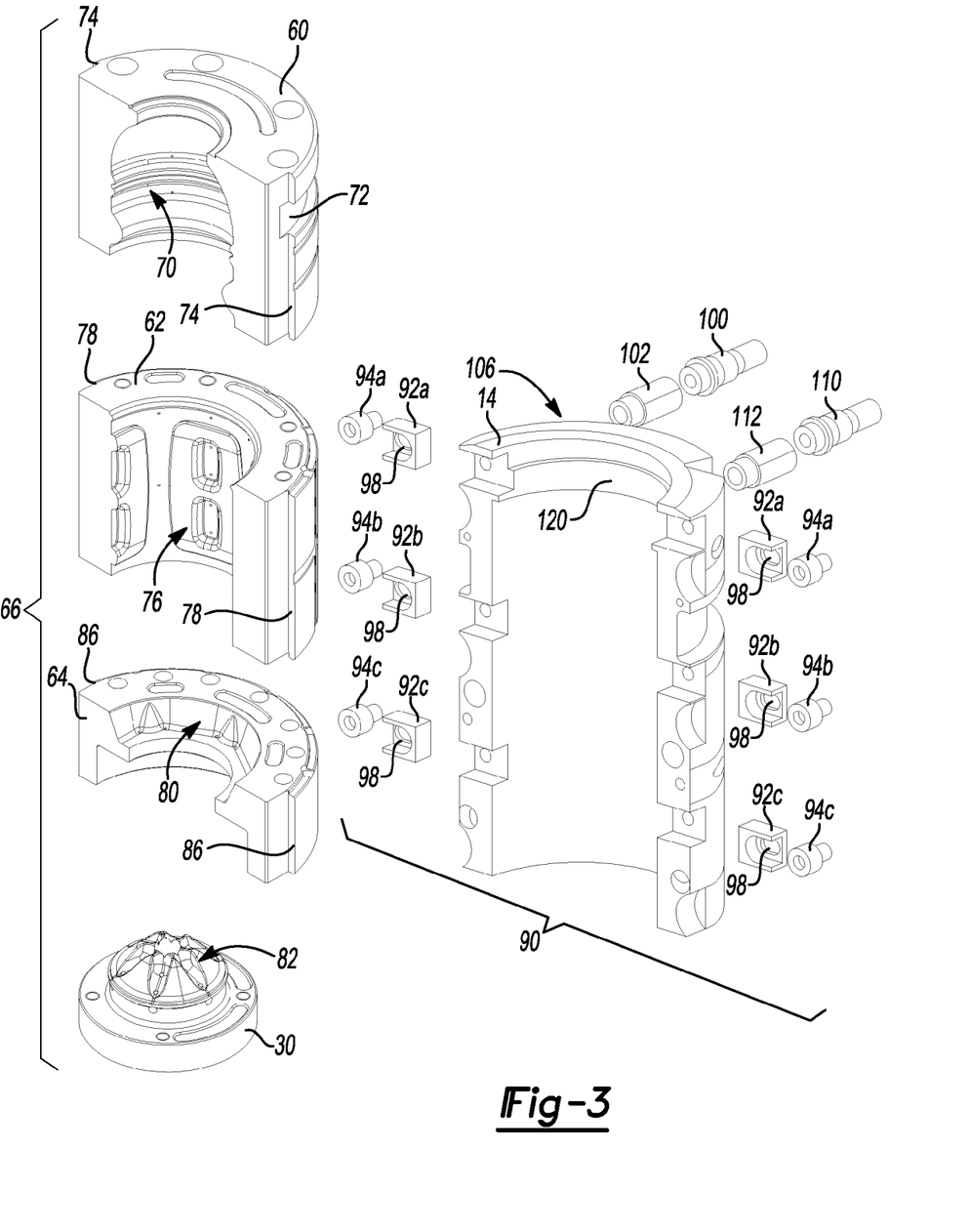
FIG. 3 is an exploded perspective view of the mold cavity insert assembly and manifold insert assembly of FIG. 2.

With reference now to FIG. 3, the mold cavity insert 12 will be described in greater detail. The mold cavity insert 12 may generally include a shoulder insert 60, a body insert 62, a heel insert 64 and the base insert 30, or any combination thereof, which are all collectively referred to herein as a cavity insert assembly 66. The shoulder insert 60 defines a shoulder profile 70 on its inner surface and an annular channel 72 on its outer surface. A first pair of ridges 74 are formed on the outer surface of the shoulder insert 60. The body insert 62 defines a body profile 76 on its inner surface and a second pair of ridges 78 on its outer surface. The heel insert 64 and the base insert 30 define a heel profile 80 and a base profile 82 on their inner surfaces, respectively. The heel insert 64 defines a third pair of ridges 86 on its outer surface. For illustrative and discussion purposes, only one-half of the shoulder insert 60, the body insert 62 and the heel insert 64 are shown in FIG. 3. It is appreciated however, that a complementary second half is provided to define the complete mold cavity.

With continued reference to FIG. 3, the manifold insert 14 is shown as part of a manifold insert assembly 90. The manifold insert assembly 90 can include various clamps 92a-92c and fasteners 94a-94c used to secure the manifold insert 14 relative to the cavity insert assembly 66 (see also, FIG. 2). More specifically, clamps 92a are adapted to locate at the first pair of ridges 74 on the shoulder insert 60. Clamps 92b are adapted to locate at the second pair of ridges 78 on the body insert 62. Clamps 92c are adapted to locate at the third pair of ridges 86 on the heel insert 64. Slots 98 formed in the respective clamps 92a-92c offer radial translation of clamps 92a-92c into engagement with the respective inserts of the cavity insert assembly 66. A fluid inlet fitting 100 is fluidly coupled to a fluid extension 102 connected at a first opening 104 (FIG. 5) formed in a first end 106 of the manifold insert 14. Similarly, a fluid outlet fitting 110 is fluidly coupled to a fluid extension 112 connected at a second opening 114 (FIG. 5) formed on the manifold insert 14. The manifold insert 14 defines an annular protrusion 120 (FIG. 4) adapted to locate within the annular channel 72 formed on the shoulder insert 60. Again, it is appreciated that a complementary second half is provided to define the complete manifold insert.

Figure 6:
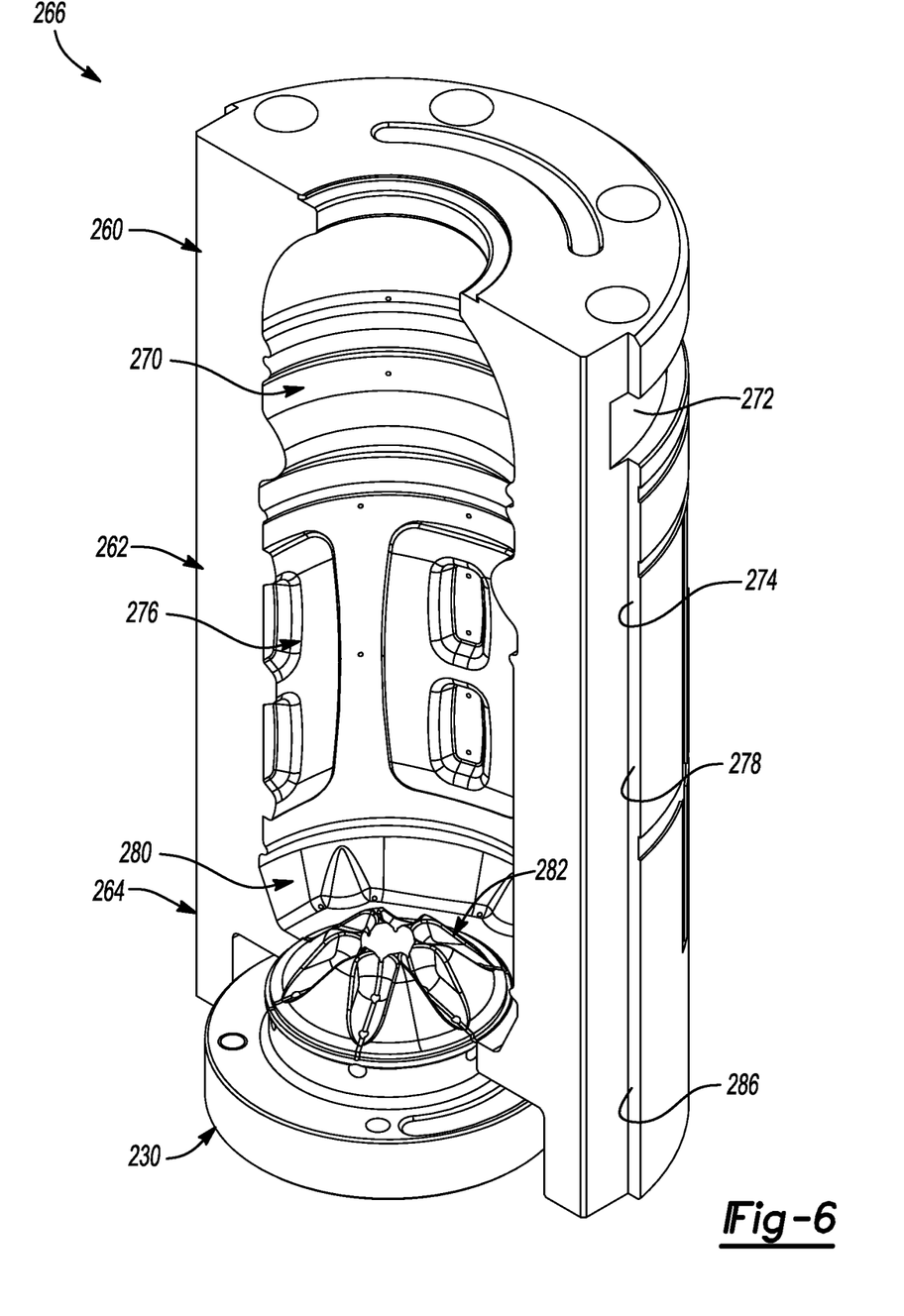
FIG. 6 is a perspective view of another embodiment of the mold cavity insert assembly and manifold insert assembly according to the present teachings.

In another example, with reference to FIG. 6, the mold cavity insert 12 may generally include a single, one-piece insert. In this regard, the single, one-piece mold cavity insert may generally include a shoulder portion 260, a body portion 262, a heel portion 264 and the base portion 230 which are all collectively referred to herein as a cavity insert assembly 266. The shoulder portion 260 defines a shoulder profile 270 on its inner surface and an annular channel 272 on its outer surface. A first pair of ridges 274 are formed on the outer surface of the shoulder portion 260. The body portion 262 defines a body profile 276 on its inner surface and a second pair of ridges 278 on its outer surface. The heel portion 264 and the base portion 230 define a heel profile 280 and a base profile 282 on their inner surfaces, respectively. The heel portion 264 defines a third pair of ridges 286 on its outer surface. For illustrative and discussion purposes, only one-half of the shoulder portion 260, the body portion 262 and the heel portion 264 are shown in FIG. 6. It is appreciated however, that a complementary second half is provided to define the complete mold cavity.

As similarly described above, and with reference to FIG. 3 and continued reference to FIG. 6, the manifold insert assembly 90 can include various clamps 92a-92c and fasteners 94a-94c used to secure the manifold insert 14 relative to the cavity insert assembly 266. More specifically, clamps 92a are adapted to locate at the first pair of ridges 274 on the shoulder portion 260. Clamps 92b are adapted to locate at the second pair of ridges 278 on the body portion 262. Clamps 92c are adapted to locate at the third pair of ridges 286 on the heel portion 264. Slots 98 formed in the respective clamps 92a-92c offer radial translation of clamps 92a-92c into engagement with the respective portions of the cavity insert assembly 266. Additionally, the manifold insert 14 defines an annular protrusion 120 (FIG. 4) adapted to locate within the annular channel 272 formed on the shoulder portion 260. Again, it is appreciated that a complementary second half is provided to define the complete manifold insert.

Figure 4:
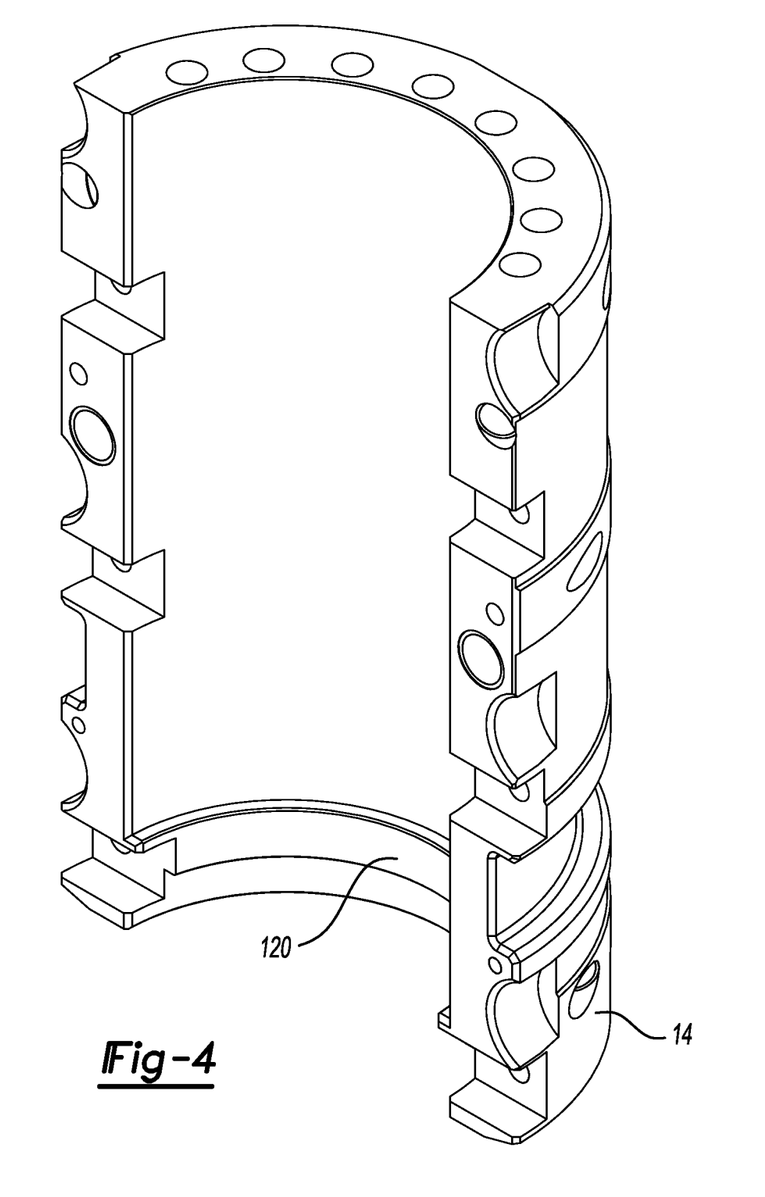
FIG. 4 is an inboard side perspective view of the manifold insert of FIG. 3.
Figure 5:
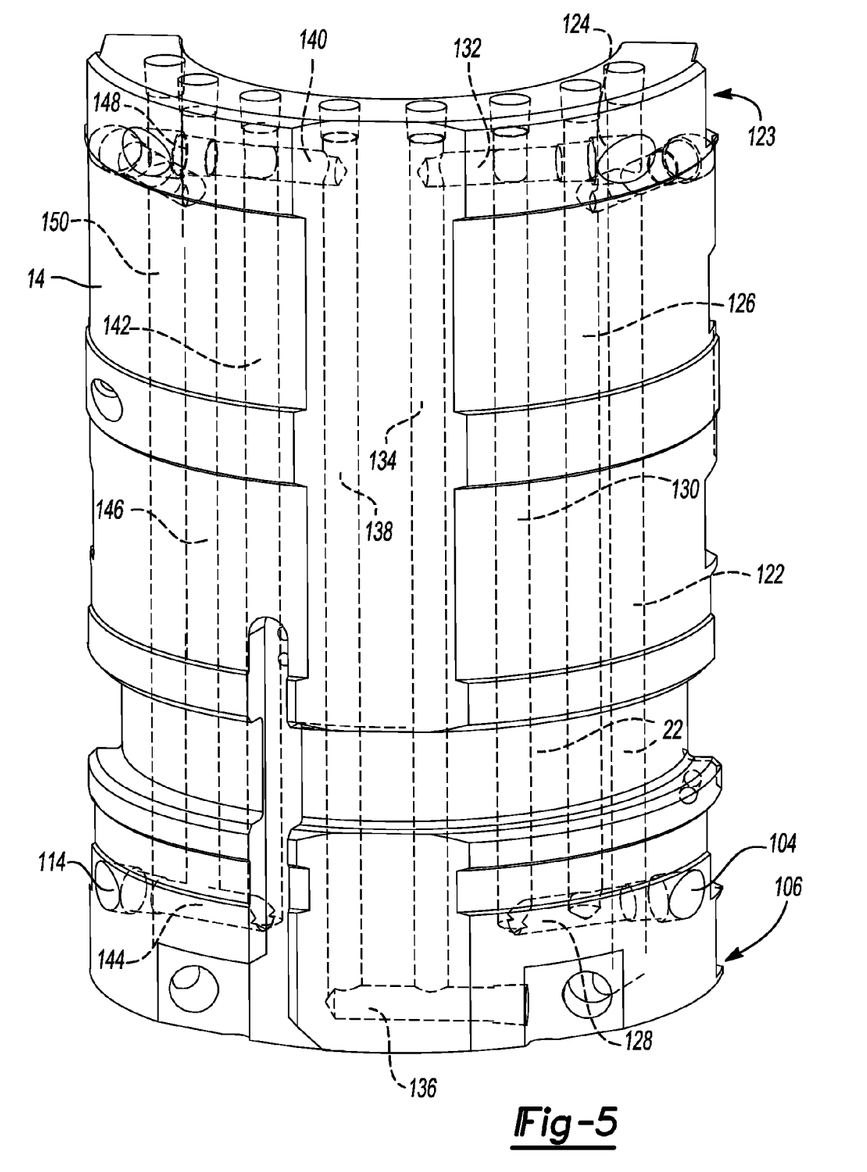
FIG. 5 is an outboard side perspective view of the manifold insert of FIG. 4 and shown with cooling channels in phantom line.

With reference now to FIGS. 4 and 5, the manifold insert 14 will be described in greater detail. The manifold insert 14 defines eight coolant channels 22 formed longitudinally therein. In this way, fluid is directed to flow from the fluid inlet fitting 100 (FIG. 3) into the first opening 104. From the first opening 104, the fluid is directed along a first longitudinal coolant channel 122 toward a second end 123 of the manifold insert 14. The fluid then flows through a first transverse connecting channel 124 and back to the first end 106 by way of a second longitudinal coolant channel 126. Fluid then is directed through a second transverse connecting channel 128 back toward the second end 123 through a third longitudinal coolant channel 130. The fluid then flows through a third transverse connecting channel 132 and back to the first end 106 by way of a fourth longitudinal coolant channel 134. Next, fluid is directed through a fourth transverse connecting channel 136 back toward the second end 123 through a fifth longitudinal coolant channel 138. The fluid then flows through a fifth transverse connecting channel 140 and back to the first end 106 through a sixth longitudinal coolant channel 142. Next, the fluid is directed through a sixth transverse connecting channel 144 back toward the second end 123 through a seventh longitudinal coolant channel 146. The fluid then flows through a seventh transverse connecting channel 148 and back to the first end 106 through an eighth longitudinal coolant channel 150. Fluid is finally directed out of the manifold insert 14 through the second opening 114. The collective eight coolant channels 22 (or individually 122, 126, 130, 134, 138, 142, 146 and 150) offer improved heat transfer control over fewer coolant channels formed in a cavity insert. By way of comparison, the eight coolant channels 22 provided by the manifold insert 14 provide an increase of about 25% cooling capability over a cavity insert having only six coolant channels. The cooling fluid may be any conventional cooling fluid.

The blow mold configuration according to the present teachings provides other advantages as well. For example, because the manifold insert 14 is separately formed from the mold cavity insert 12, it does not need to be removed during a cavity insert changeover. In this way, only the inner mold cavity insert 12 would need to be exchanged when formation of a container having a distinct size, profile, etc., is desired. Likewise, the manifold insert 14 can be used again for other container designs. Further, design and formation of subsequent cavity inserts is significantly less costly because there is no need to design and construct coolant channels. Mold cavity inserts formed without coolant channels can be lighter and easier to change out. In one example, the mold shell assembly 10 disclosed herein, while not limited to, may be particularly useful for formation of containers having less than 75 mm (2.95 inches) diameters (37.5 mm (1.48 inches) radius).

Additionally, the mold shell assembly 10 allows for optimal venting. According to a traditional prior art mold design, the exterior mounting features of the cavity, the interior mold definition of the cavity and the location of the fluid channels are all determined. Next, the cavity venting is located in the remaining space of the cavity. As can be appreciated, a compromise must be reached to accommodate all features within one mold cavity. The configuration of the present teachings provides the mold cavity insert 12 and the manifold insert 14 being separately formed from each other, resulting in a fluid channel/cavity vent compromise.

An exemplary method of forming a container with the blow mold shell assembly 10 will now be described. At the outset, the selected mold cavity insert 12 is located within the manifold insert 14. The manifold insert 14 may be removably secured inboard of the mold holder 16 and machine 18 (FIG. 1). The pedestal assembly 26 can also be selectively located in cooperative engagement with the base insert 30 of the cavity insert assembly 66 and/or the base portion 230 of the cavity insert assembly 266. A machine (not illustrated) may place a preform (not illustrated) heated to a temperature between approximately 190° F. to 250° F. (approximately 88° C. to 121° C.) into the mold cavity insert 12. The mold cavity insert 12 may be heated to a temperature between approximately 250° F. to 350° F. (approximately 121° C. to 177° C.). A stretch rod apparatus (not illustrated) stretches or extends the heated preform within the mold cavity insert 12 to a length approximately that of the resultant container thereby molecularly orienting the polyester material in an axial direction generally corresponding with a central longitudinal axis of the container. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold profile 20 of the mold cavity insert 12 and further molecularly orienting the polyester material in a direction generally perpendicular to the axial direction, thus establishing the biaxial molecular orientation of the polyester material in most of the container. The pressurized air holds the mostly biaxial molecularly oriented polyester material against the mold profile 20 of the mold cavity insert 12 for a period of approximately two (2) to five (5) seconds before removal of the container from the mold cavity. During the molding operation, fluid is passed through the coolant channels 22 in the manifold insert 14 to cool the mold cavity insert 12 and the blow mold shell assembly 10 as a whole. Other methods as well may be used to form a container utilizing the blow mold shell assembly 10.

Once the resultant container has been formed, the container is removed and the process repeats. When it is desired to mold a different container, such as one having a different shape, size and/or profile, the mold cavity insert 12 is simply replaced with one having the desired characteristics. It is important to recognize at this point, that it is not necessary to replace or remove the manifold insert 14. Instead, the manifold insert 14 can be used again with the new mold cavity insert. In addition, the related fluid fittings 100 and 110 do not need to be replaced or reconnected. Rather, they simply remain fluidly connected to the manifold insert 14 and ready to supply fluid for the next mold sequence.

Alternatively, other manufacturing methods using other conventional materials including, for example, polypropylene, high-density polyethylene, polyethylene naphthalate (PEN), a PET/PEN blend or copolymer, and various multilayer structures may be suitable for the manufacture of the resultant plastic container. Those having ordinary skill in the art will readily know and understand plastic container manufacturing method alternatives.

There are many bottled products where this technology may be applicable. Products such as dairy products, liquor, household cleaners, salad dressings, sauces, spreads, syrups, edible oils, personal care items, and others may be formed utilizing such a mold assembly. While much of the description has focused on the production of PET containers, it is contemplated that other polyolefin materials (e.g., polyethylene, polypropylene, etc.) as well as a number of other plastics may be processed using the teachings discussed herein.

While the above description constitutes the present disclosure, it will be appreciated that the disclosure is susceptible to modification, variation and change without departing from the proper scope and fair meaning of the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blow mold shell assembly comprising:
   a mold cavity insert defining a mold profile on an inner surface, said mold cavity insert is substantially solid throughout its cross-section and precluded from passing coolant, said mold cavity insert further comprising:
   a removable insert forming a container profile; and
   a manifold insert separately formed from said mold cavity insert, disposed in contact with and outboard of said mold cavity insert, said manifold insert further comprising:
   a plurality of coolant channels defined longitudinally in said manifold insert and aligned along a curved line extending between opposite ends of the manifold, said manifold insert defining a single fluid inlet opening to said plurality of coolant channels and a single fluid outlet opening from said plurality of coolant channels.

2. The blow mold shell assembly of claim 1 wherein eight coolant channels are formed longitudinally therethrough.

3. The blow mold shell assembly of claim 1, further comprising a mold holder arranged outboard of said manifold insert.

4. The blow mold shell assembly of claim 3 wherein said manifold insert is adapted to remain assembled to said mold holder during a mold cavity insert exchange.

5. The blow mold shell assembly of claim 1 wherein said mold profile defines a container radius of less than 37.5 mm (1.48 inches).

6. The blow mold shell assembly of claim 1 wherein said mold cavity insert is manufactured by one of a selective laser sintering process and a direct metal laser sintering process.

7. The blow mold shell assembly of claim 1 wherein said removable insert of said mold cavity insert further comprises a plurality of removable inserts forming a container profile.

8. A blow mold shell assembly comprising:
   a first mold component having a mold profile on an inner surface, the first mold component further comprising:
   a separate removable insert forming the mold profile, said first mold component substantially solid throughout its cross-section and precluded from passing coolant;
   a second mold component disposed outboard of said first mold component; and
   a third mold component movable relative to and disposed intermediate of said first and second mold components, said third mold component including a manifold insert defining a plurality of coolant channels formed longitudinally therein, said manifold insert attached to said second mold component, said first mold component attachable and detachable to said manifold insert, said first mold component including a convex surface opposite to said mold profile and said manifold insert including a concave surface complementary to said convex surface, said convex surface abuts said concave surface when said first mold component is attached to said manifold insert, said manifold insert further defining a single fluid inlet opening permitting access into said plurality of coolant channels and a single fluid outlet opening permitting access from said plurality of coolant channels.

9. The blow mold shell assembly of claim 8 wherein said plurality of coolant channels includes eight coolant channels.

10. The blow mold shell assembly of claim 8 wherein said manifold insert is adapted to remain assembled to said second mold component during a mold cavity insert exchange.

11. The blow mold shell assembly of claim 8 wherein said mold profile defines a container radius of less than 37.5 mm (1.48 inches).

12. The blow mold shell assembly of claim 8 wherein said separate removable insert of said first mold component further comprises a plurality of separate removable inserts forming the mold profile.

13. A blow mold shell assembly comprising:
- a mold cavity insert defining a mold profile on an inner surface and including an outer convex surface opposite to said inner surface, said mold cavity insert defining a substantially solid cross-section free from coolant channels and further comprising a separate removable insert forming the mold profile;
- a manifold insert separately formed from said mold cavity insert disposed outboard of said mold cavity insert and having a plurality of coolant channels formed therein and aligned along a curved line extending between opposite ends of the manifold insert, wherein said removable insert is attached to said manifold insert with a separate clamp such that the outer convex surface abuts an inner concave surface of the manifold insert, the outer convex surface and the inner concave surface are complementary to each other;
- a single first fluid fitting and a single second fluid fitting connected to said manifold insert and adapted, respectively, to deliver fluid to and remove fluid from said manifold insert; and
- a holder insert separately formed from and disposed outboard of said manifold insert, said manifold insert attached to said holder insert.

14. The blow mold shell assembly of claim 13 wherein said manifold insert is adapted to remain assembled to said holder insert during a mold cavity insert exchange.

15. The blow mold shell assembly of claim 13 wherein said mold cavity insert is manufactured by one of a selective laser sintering process and a direct metal laser sintering process.

16. The blow mold shell assembly of claim 13 wherein said plurality of coolant channels are a plurality of longitudinal coolant channels, the blow mold shell assembly further comprising:
- a plurality of transverse coolant channels that are situated transverse to said plurality of longitudinal coolant channels, wherein each longitudinal coolant channel is fluidly connected to an adjacent longitudinal coolant channel by only one of said plurality of transverse coolant channels.

17. The blow mold shell assembly of claim 13 wherein said separate removable insert of said mold cavity insert further comprises a plurality of separate removable inserts forming the mold profile.

* * * * *